J. O. BERG.
TOOL FOR TREATING ARTIFICIAL STONE.
APPLICATION FILED JAN. 2, 1913.
1,102,856. Patented July 7, 1914.
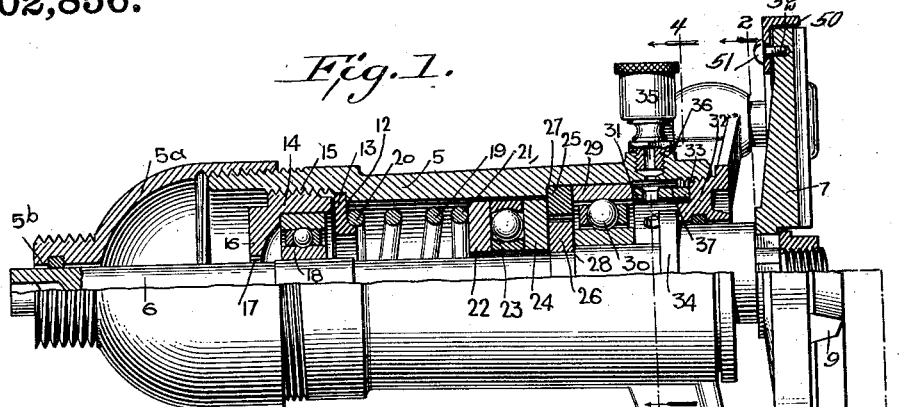
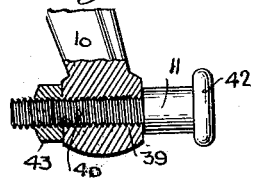
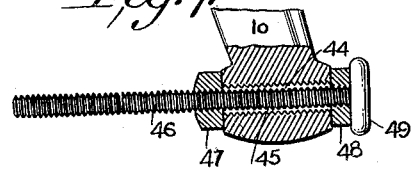
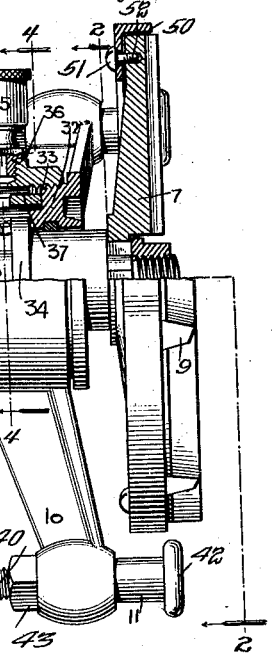
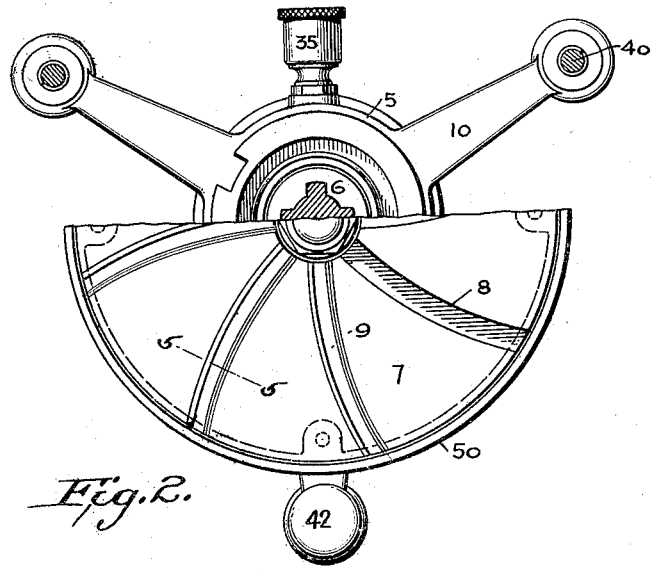
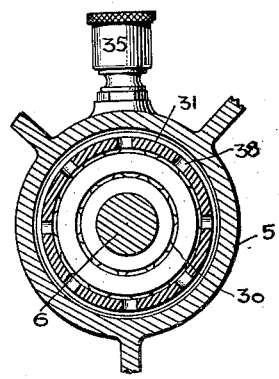
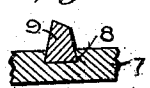
WITNESSES
INVENTOR
John O. Berg.
BY
ATTORNEYS

UNITED STATES PATENT OFFICE.

JOHN OTTO BERG, OF NEW YORK, N. Y.

TOOL FOR TREATING ARTIFICIAL STONE.

1,102,856.   Specification of Letters Patent.   Patented July 7, 1914.

Application filed January 2, 1913. Serial No. 739,662.

*To all whom it may concern:*

Be it known that I, JOHN O. BERG, a citizen of the United States, and a resident of the city of New York, borough of Manhattan, in the county and State of New York, have invented a new and Improved Tool for Treating Artificial Stone, of which the following is a full, clear, and exact description.

My invention has for its object to provide a tool for treating artificial stone having a casing with projections for engaging a member to be finished, and with a shaft journaled in bearings in the casing and having a cutting head, the shaft and the cutting head being held yieldingly extended within the projections by a spring in the casing.

Additional objects of the invention will appear in the following complete specification, in which the preferred form of the invention is described.

In the drawings similar characters of reference indicate corresponding parts in all the views, in which—

Figure 1 is a side elevation of my invention, with parts broken away to show the construction; Fig. 2 is a sectional view on the line 2—2 of Fig. 1; Fig. 3 is a fragmentary sectional view showing how the studs are mounted on the arms; Fig. 4 is a sectional view on the line 4—4 of Fig. 1; Figs. 5 and 6 are fragmentary sectional views, showing how the knives are secured on the cutting head; and Fig. 7 is a sectional view showing a modified arrangement by which studs may be held in position relatively to the arms.

The purpose of the tool which will hereafter be described is for the removal of the glazed surface formed on walls and ceilings in applying imitation stone. This glazed surface shows the discoloration of the chemical action of cements, and other ingredients used as a base, and it is not as a rule the proper artistic finish which is required for stones of various kinds. The tool in cutting the surface brings out the pores of the stone, and removes the discoloration.

By referring to the drawings it will be seen that a casing 5 is provided, in which is journaled a shaft 6, having a head 7, having curved grooves 8, in which are disposed the knives 9, and 9ª, this shaft 6 being held yieldingly extended relatively to the arms 10, which are secured to the casing 5, and which project therefrom, these arms 10 having secured thereto the studs 11 in a manner which will be hereafter described. On the inner side of the casing 5 there is a shoulder 12, against which is disposed a collar 13, this collar 13 being held against the shoulder 12 by means of the threaded member 14, which meshes in the inner thread 15 in the casing. The threaded member 14 has a head portion 16, with an opening 17, through which the shaft 6 extends.

Between the head 16 of the threaded member 14, and the collar 13, there are disposed ball bearing members 18, which serve to hold the shaft 6 in position when rotating with as little friction as possible. The end 20 of the spring 19 rests against the collar 13, and the end 21 of the spring 19 is engaged by the end 22 of the ball bearing 23, the other end 24 of this ball bearing collar 23 being normally engaged by the member 25. The member 25 rests against the shoulder 27 at the inner side of the casing, and the collar 26 is engaged by the shoulder 28 on the shaft. The other side 29 of the ball bearing 30 is engaged by the lubricant collar 31, the lubricant collar 31 being held in engagement with the other side 29 of the ball bearing 30 by means of the screw 32, which meshes with the inner thread 33 in the casing 5. The member 25 is held against the shoulder 27 of the casing by the outer side 29 of the bearing 30, the lubricant collar 31, and the screw 32, the member 25 normally engaging the end 24 of the ball bearings 23. By this means the outward movement of the shaft 6 is limited. The offset 34 on the shaft 6 is mainly for the purpose of preventing any foreign substances from entering the lubricator parts. The grease cup 35 is secured in an opening 36 in the casing 5, and serves to feed a lubricant to the space 37 between the casing 5 and the lubricant collar 31. This lubricant collar 31 has a plurality of openings 38, which serve to feed the lubricant to the shaft 6, no matter in what position the casing 5 may be disposed. As will be seen by referring to Fig. 3 of the drawings, the arms 10 have threaded openings 39, in which are normally disposed screws 40 extending from the studs 11 having heads 42. These screws 40 may be turned in the threaded opening 39 so that the studs 11 will be disposed as desired relatively to the arms 10 when the nuts 43 may be turned home, to hold the said studs 11 in adjusted position, relatively to the said arms. If desired, a collar 44, with an outer thread, may mesh in this threaded opening 39, this collar 44 having an inner thread 45, in which may mesh the screw 46, serving as the stud. This screw 46 may be turned relatively to the collar 44, so that it may be adjusted relatively to the arm 10, and when adjusted the nuts 47 and 48 may be turned against the arm 10 to hold the screw 46 in position. This screw 46 has a head 49, for engaging the member which is to be ground.

The grooves 8 in the head 7 are preferably curved, as shown in Fig. 2 of the drawings, and the knives 9 may be secured to the head 7 by sliding them in the grooves 8. A flange 50 is disposed around the periphery of the head 7, and is held in position by screws 51, which mesh in threaded orifices 52 in the rear of the head 7. This flange 50 holds the knives 9 in position, and prevents them from being freed through centrifugal force.

In Fig. 5 I show one form of knife, but it will be understood that these knives may be manufactured in many forms, as, for instance, the form 9ª, shown in Fig. 6 of the drawings, which has a curved surface 53. The rear of the casing 5 is closed by an end piece 5ª having an opening 5ᵇ through which the shaft 6 extends.

It will be understood that one or more of the studs 11 may be extended at a greater distance from the arms 10 than are the other studs so that the head will be disposed in position to finish artificial stone having an uneven surface.

Having thus described my invention, I claim as new and desire to secure by Letters Patent:

1. In a tool for treating artificial stone, a head having a rear portion with threaded orifices and a face with grooves extending to the periphery of the head, the side walls of the grooves diverging inward from the face, knives slidably disposed in the grooves, a member having a flange disposed around the periphery of the head, the member extending at the rear of the head and being provided with orifices, and screws disposed in the last-mentioned orifices and meshing in the threaded orifices.

2. In a tool for treating artificial stone, a head having a rear portion with threaded orifices and a face with grooves extending to its periphery, the side walls of the grooves diverging inward from the face, knives slidably disposed in the grooves, a member having a flange disposed around the periphery of the head and the outer ends of the knives to serve as a guard, the member extending at the rear of the head and being provided with orifices, and screws disposed in the last-mentioned orifices and meshing in the threaded orifices.

3. In a tool for treating artificial stone, a casing having a threaded end and an inner shoulder spaced therefrom, a collar having lubricant openings disposed in the casing adjacent the threaded end and spaced from the inner wall of the casing, means engaging the shoulder and one end of the lubricant collar, a screw having an opening and meshing with the threaded end of the casing for pressing the lubricant collar against the said means, a shaft disposed in the collar and extending through the opening in the screw, an offset on the shaft at the screw and a cutting head on the shaft.

4. In a tool for treating artificial stone, a casing having a threaded end and an inner shoulder spaced therefrom, a collar having lubricant openings disposed in the casing adjacent the threaded end and spaced from the inner walls of the casing, means engaging the shoulder and one end of the lubricant collar, a screw having an opening and meshing with the threaded end of the casing for pressing the lubricant collar against the said means, a shaft disposed in the collar and extending through the opening in the screw, and a cutting head on the shaft.

5. In a tool for treating artificial stone, a casing having a shoulder and provided with an inner threaded surface adjacent the shoulder, a collar disposed against the shoulder, a threaded member meshing with the threaded surface for holding the collar against the shoulder, a shaft in the casing disposed through the collar, and having a shoulder, a spring disposed against the collar, means connecting the last shoulder with the spring, a collar having lubricant openings spaced apart therein, and disposed within the casing around the shaft, means to limit the inward movement of the lubricant collar, there being an inner thread in the casing at the lubricant collar, and a threaded member meshing with the last thread in the casing for pressing the lubricant collar inwardly.

6. In a tool for treating artificial stone, a casing having a shoulder with an inner thread adjacent thereto, and a second shoulder spaced therefrom, a collar disposed against the first shoulder, a threaded member for holding the collar against the first shoulder, a shaft in the casing disposed through the collar, and having a shoulder, a spring disposed against the collar, means in connection with the shoulder on the shaft for engaging the spring, a collar disposed against the second shoulder in the casing and engaging the said means, a lubricant collar disposed in the casing and around the shaft, having openings spaced apart, means in connection with the second collar for limiting the inward movement of the lubricant collar, there being a thread in the casing, and a threaded member meshing with the last-mentioned thread in the casing, and pressing against the lubricant collar.

In testimony whereof I have signed my name to this specification in the presence of two subscribing witnesses.

JOHN OTTO BERG.

Witnesses:
  JULIUS M. HOWENSTEIN,
  HELEN REID.

Copies of this patent may be obtained for five cents each, by addressing the "Commissioner of Patents, Washington, D. C."